(12) United States Patent
Wolfe, IV et al.

(10) Patent No.: US 8,051,906 B2
(45) Date of Patent: Nov. 8, 2011

(54) SECONDARY LOOP-INTEGRAL HEATER CORE AND COOLER

(75) Inventors: Edward Wolfe, IV, E. Amherst, NY (US); Gregory J. Kowalski, Cambria, NY (US); Prasad S. Kadle, Williamsville, NY (US); John F. O'Brien, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 534 days.

(21) Appl. No.: 12/274,565

(22) Filed: Nov. 20, 2008

(65) Prior Publication Data

US 2010/0122793 A1 May 20, 2010

(51) Int. Cl.
*G05D 23/00* (2006.01)
*F28F 27/02* (2006.01)
*F28F 27/00* (2006.01)
*F28D 7/10* (2006.01)

(52) U.S. Cl. .......... 165/287; 165/296; 165/101; 165/96; 165/140

(58) Field of Classification Search .................. 165/296, 165/297, 298, 96, 139, 101, 140, 144, 145
See application file for complete search history.

(56) References Cited

U.S. PATENT DOCUMENTS

| 6,405,793 | B1 | 6/2002 | Ghodbane et al. |
| 6,854,513 | B2 | 2/2005 | Shirota et al. |
| 6,986,385 | B1 | 1/2006 | Gilles et al. |
| 7,063,137 | B2 | 6/2006 | Kadle et al. |
| 7,322,399 | B2 * | 1/2008 | Guerrero et al. ............... 165/101 |
| 2001/0020529 | A1 | 9/2001 | Karl |
| 2004/0134216 | A1 * | 7/2004 | Heyl ............................ 62/324.1 |

* cited by examiner

*Primary Examiner* — Judy Swann
*Assistant Examiner* — Jason Thompson
(74) *Attorney, Agent, or Firm* — Patrick M. Griffin

(57) ABSTRACT

The assembly includes a pair of heat exchangers, each including an upper and lower manifold, parallel and spaced relative to one another. Tubes extend between each set of upper and lower manifolds with fins disposed between each of the tubes. A valve system controls fluid flow between the upper manifolds and the lower manifolds. The valve system is movable between a maximum cooling mode with fluid flow form the first upper manifold through both of the tubes and to said first lower manifold. A temperate mode allows fluid to flow from the first upper manifold to the first lower manifold and from the second upper manifold to the second lower manifold to prevent flash fogging. A maximum cooling mode allows fluid to flow from the second upper manifold through both of the first and second tubes to the lower manifolds.

8 Claims, 7 Drawing Sheets

|  | Temperatures (°F) | | | |
|---|---|---|---|---|
| Modes | <30 | 35-65 | 65-85 | >85 |
| Maximum Heating | 0 | X | X | X |
| Temperate | 0 | 0 | 0 | 0 |
| Maximum Cooling | X | 0 | X | 0 |

| 0 | Allowed Mode |
|---|---|
| X | Not Allowed Mode |

FIG. 6

SECONDARY LOOP-INTEGRAL HEATER CORE AND COOLER

BACKGROUND OF THE INVENTION

1. Field of the Invention

The subject invention relates to a heat exchanger assembly for heating and cooling the cabin of a vehicle.

2. Description of the Prior Art

U.S. Pat. No. 6,405,793, assigned to the assignee of the subject invention, discloses a heat exchanger assembly having a first heat exchanger and a second heat exchanger sandwiched together in parallel and abutting relationship to one another. The first heat exchanger includes a first upper manifold and a first lower manifold spaced and parallel from the first upper manifold. The first heat exchanger includes a plurality of first tubes parallel and spaced relative to one another and extending between the first manifolds. The second heat exchanger includes a second upper manifold and a second lower manifold spaced and parallel from the second upper manifold. The second heat exchanger includes a plurality of second tubes parallel and spaced relative to one another and extending between the second manifolds.

Heat exchangers are often used in typical HVAC systems for heating and cooling the cabin of a vehicle. The '793 patent discloses a system for allowing refrigerant or engine coolant to run through both sets of tubes at a given time, which in certain modes can cause flash fogging of the vehicle windshields.

SUMMARY OF THE INVENTION

The invention provides for a valve system for controlling fluid flow between the upper manifolds and for controlling fluid flow between the lower manifolds. The valve system is movable between a maximum cooling mode with fluid flowing from the first upper manifold through both of the tubes to the first lower manifold and to a temperate mode with fluid flowing from the first upper manifold through the first tubes to the first lower manifold and from the second upper manifold through the second tubes to the second lower manifold and to a maximum heating mode with fluid flowing from the second upper manifold through both of the first and second tubes to the lower manifold.

The temperate mode prevents flash fogging of the windshields.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE EXEMPLARY EMBODIMENT

Referring to the Figures, wherein like numerals indicate corresponding parts throughout the several views, an integral heating and cooling assembly is shown and illustrated.

A first heat exchanger 20 and a second heat exchanger 22, both generally indicated in FIGS. 1-4, are sandwiched together in parallel or series and abutting relationship to one another. The first heat exchanger 20 includes a first upper manifold 24, generally indicated, and a first lower manifold 26 generally indicated spaced and parallel from the first upper manifold 24. The first heat exchanger 20 includes a plurality of first tubes 28 in parallel and spaced relationship to one another and the first tubes 28 extend between the first manifolds 24, 26. The second heat exchanger 22 includes a second upper manifold 30 and a second lower manifold 32 spaced and parallel from the second upper manifold 30. The second heat exchanger 22 includes a plurality of second tubes 34 in parallel and spaced relationship to one another and the second tubes 34 extend between the second manifolds 32, 30. The tubes 28, 34 present flat sides and a plurality of air fins 36 are disposed between and brazed to the flat sides of the tubes 28, 34 and extend between the upper and lower manifolds 26, 32 for dissipating heat to/from the tubes 28, 34.

Figure 1:
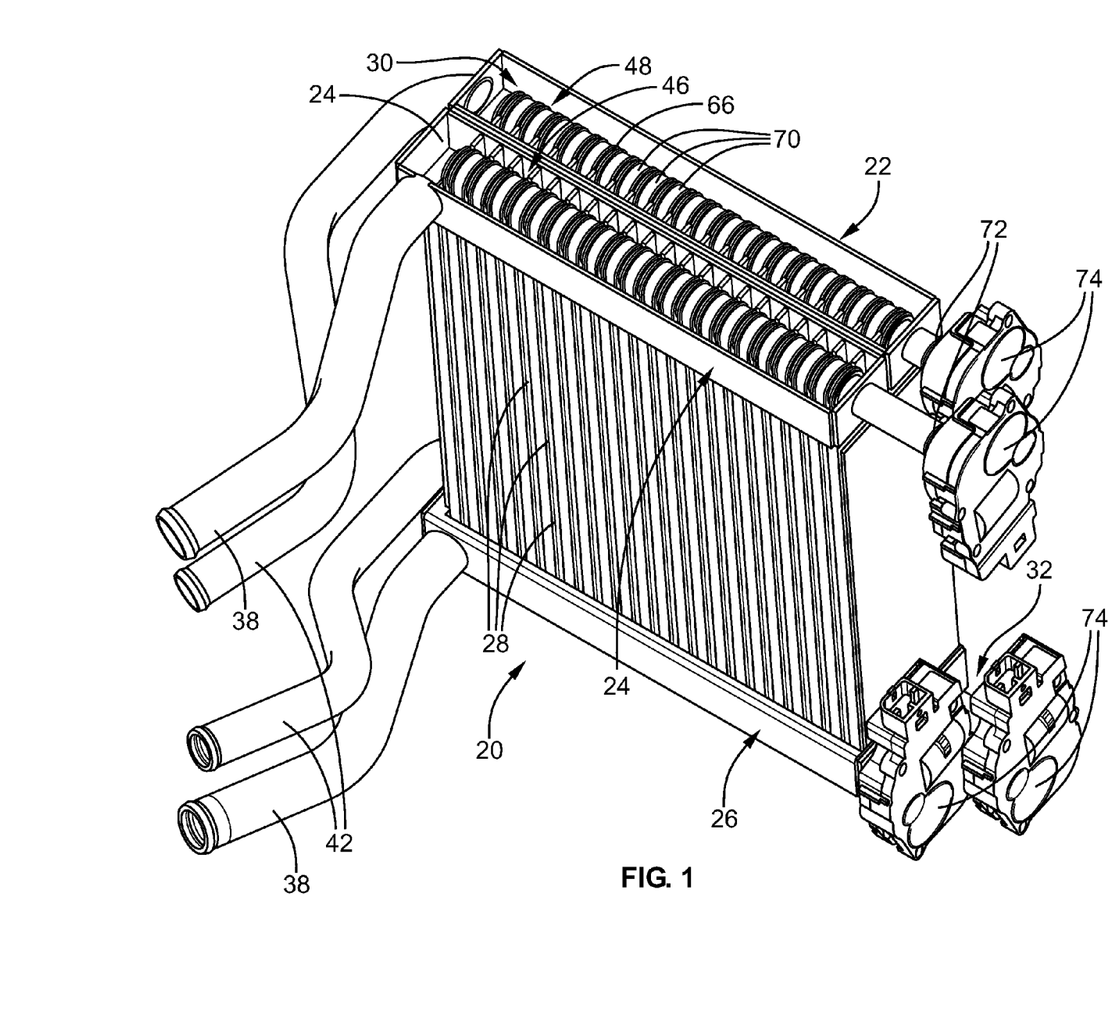
FIG. 1 is a perspective view of the present invention.
Figure 2:
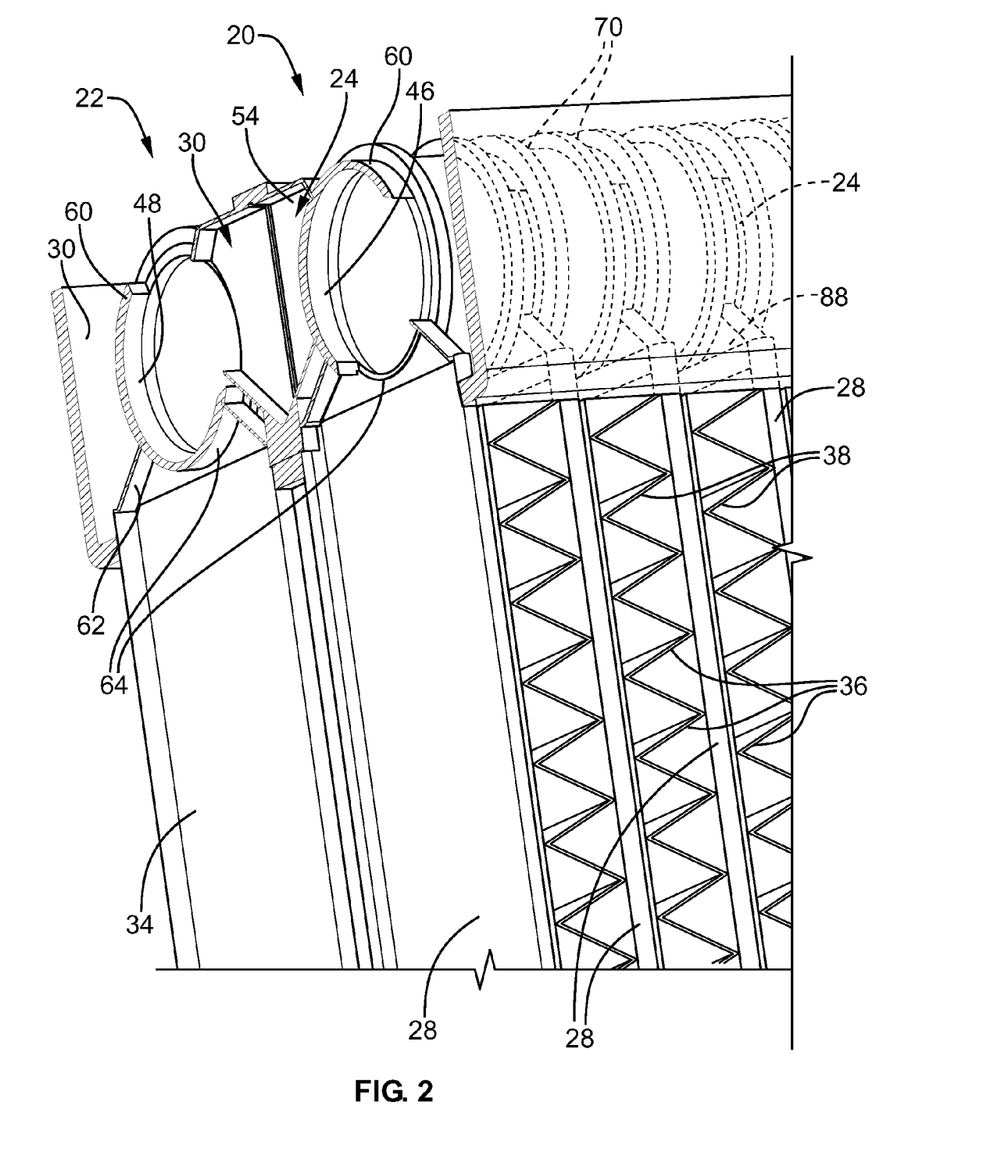
FIG. 2 is a perspective and cross sectional and fragmentary view of the present invention.
Figure 4:
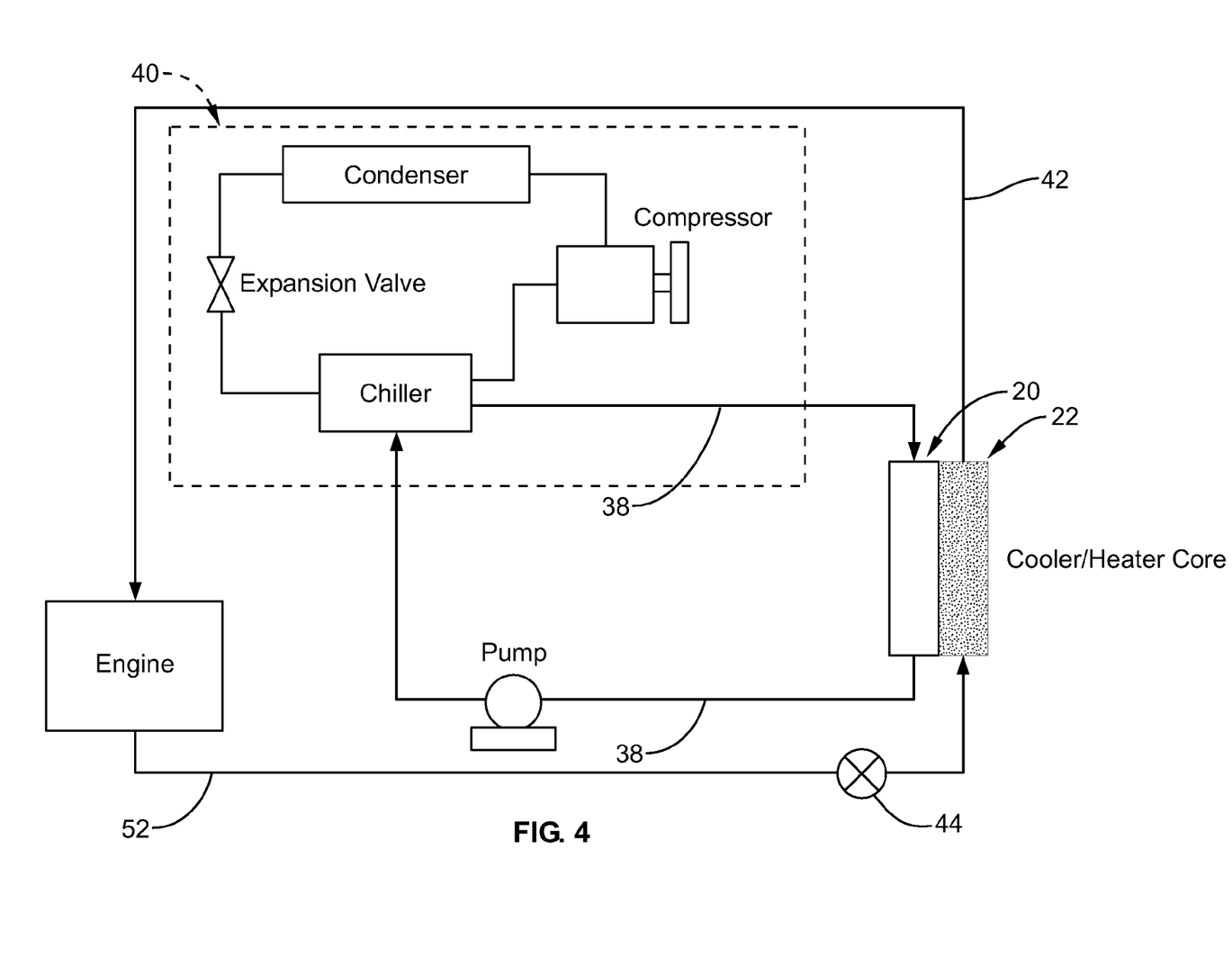
FIG. 4 is a schematic view showing the present invention.

As shown in FIGS. 1 and 4, a cool fluid line 38 is in fluid communication with the first upper manifold 24 for delivering cool fluid, or coolant, to the first upper manifold 24. A chiller is in fluid communication with the cool fluid line 38 for cooling fluid in the cool fluid line 38. The cool fluid line 38 is also in fluid communication with the first lower manifold 26 for allowing the cool fluid to leave the first heat exchanger 20. A refrigeration system 40, generally indicated in FIG. 4, including a condenser and a compressor and an expansion valve, is in fluid communication with the chiller. An engine is in fluid communication with a hot fluid line 42 for warming the hot fluid in the hot fluid line 42. The hot fluid line 42 is in fluid communication with the second upper manifold 30 for delivering hot engine fluid to the second upper manifold 30. A regulator 44 is disposed on the hot fluid line 42 for controlling the flow of hot fluid to the second upper manifold 30. This may also be accomplished by valve elements, as described below. The hot fluid line 42 is also in fluid communication with the second lower manifold 32 for allowing the hot fluid to leave the second heat exchanger 22.

A valve system controls fluid flow between the upper manifolds 24, 30 and fluid flow between the lower manifolds 26, 32. The valve system is movable to a maximum cooling mode, schematically shown in FIG. 3A, allowing fluid to flow from the first upper manifold 24 through both of the first and second tubes 28, 34 to the first lower manifold 26. The valve system is also movable to a temperate mode, schematically shown in FIG. 3B, allowing fluid to flow from the first upper manifold 24 through the first tubes 28 to the first lower manifold 26 and from the second upper manifold 30 through the second tubes 34 to the second lower manifold 32. The valve system is further movable to a maximum heating mode, schematically shown in FIG. 3C, allowing fluid to flow from the second upper manifold 30 through both of the first and second tubes 28, 34 to the lower manifold.

The valve system includes a first upper rotary valve 46, generally shown, disposed in the first upper manifold 24, a second upper rotary valve 48, generally shown, disposed in the second upper manifold 30, a first lower rotary valve 50, generally shown, disposed in the first lower manifold 26, and a second lower rotary valve 52, generally shown, and disposed in the second lower manifold 32. Each of the rotary valves 46, 48, 50, 52 define a cross flow port 54 for fluid communication between the upper manifolds 24, 30 and the lower manifolds 26, 32. Each of the rotary valves 46, 48, 50, 52 also define a manifold port 56 for fluid communication with the manifold in which the rotary valve 46, 48, 50, 52 is disposed and a tube port 58 communicating with the tubes 28, 34 associated with the manifold in which the rotary valve 46, 48, 50, 52 is disposed. In other words, each of the rotary valves 46, 48, 50, 52 defines a manifold port 56 to allow each rotary valve 50, 46, 48, 52 to open to its associated manifold and defines a tube port 58 open to the associated tubes 28, 34.

Each of the rotary valves 46, 48, 50, 52 includes a semi-circular valve element 60 rotatable between three positions. The first position is a cross flow position which allows fluid to flow through opposite ones of the cross flow ports 54 between the manifolds 24, 26, 30, 32 while preventing fluid flow through the respective manifold ports 56 associated therewith as illustrated by the first valves 46, 48, 50, 52 in FIG. 3A and the second valves 46, 48, 50, 52 in FIG. 3C. Second, the rotary valves 46, 48, 50, 52 include a blocking position for preventing fluid flow through the cross flow port 54 associated therewith as illustrated by all of the valves 46, 48, 50, 52 in FIG. 3B. Lastly, the rotary valves 46, 48, 50, 52 include an intermediate position to allow fluid to flow through the cross flow port 54 and the manifold port 56 associate therewith as illustrated by the second valves 46, 48, 50, 52 in FIG. 3A and the first valves 46, 48, 50, 52 in FIG. 3C.

Each of the valve elements 60 has a semi-circular cross section defining an opening of an angle of approximately of degrees. In other words, the valve elements 60, each have a curved shape, permit the opening of the rotary valves 46, 48, 50, 52 to open to the cross flow ports 54 and the manifold ports 56. Thus, when the valve elements 60 are in a cross flow position, fluid is blocked from flowing through the manifold ports 56, but is permitted to flow through the cross flow ports 54 and the tube ports 58, as shown by the second valves 46, 48, 50, 52 in FIG. 3A and the first valves 46, 48, 50, 52 in FIG. 3C. Correspondently, when the valve elements 60 are in a blocking position, fluid is permitted to flow through the manifold ports 56, but is blocked from flowing through the cross flow ports 54, as shown by the valves 46, 48, 50, 52 in FIG. 3B. This allows cool fluid to flow through the first manifolds 24, 26 and first tubes 28 and hot fluid to flow through the second manifolds 32, 30 and second tubes 34. When the valve elements 60 are in the intermediate position, fluid is permitted to flow through the cross flow port 54 and the manifold port 56, as shown by the first valves 46, 48, 50, 52 in FIG. 3A and the second valves 46, 48, 50, 52 in FIG. 3C.

Each of the tube ports 58 is defined by a tube cap 62 extending into the associated one of the manifolds 24, 26, 30, 32 from each of the tubes 28, 34 with the tube cap 62 defining a semi-circular tube mouth 64. Each of the cross flow ports 54 between the upper manifolds 24, 30 and between the lower manifolds 26, 32 is defined by a cross flow housing 66 disposed above and laterally overlapping the tubes 28, 34 to establish cross flow mouths 68. The valve system includes a ring 70 disposed on each side of the tube caps 62 and engaging the respective sides of the cross flow housings 66 for rotatably supporting the semi-circular valve elements 60. In other words, the rings 70 hold the valve element 60 in fluid communication with the tube ports 58 and cross flow ports 54.

Figure 3:
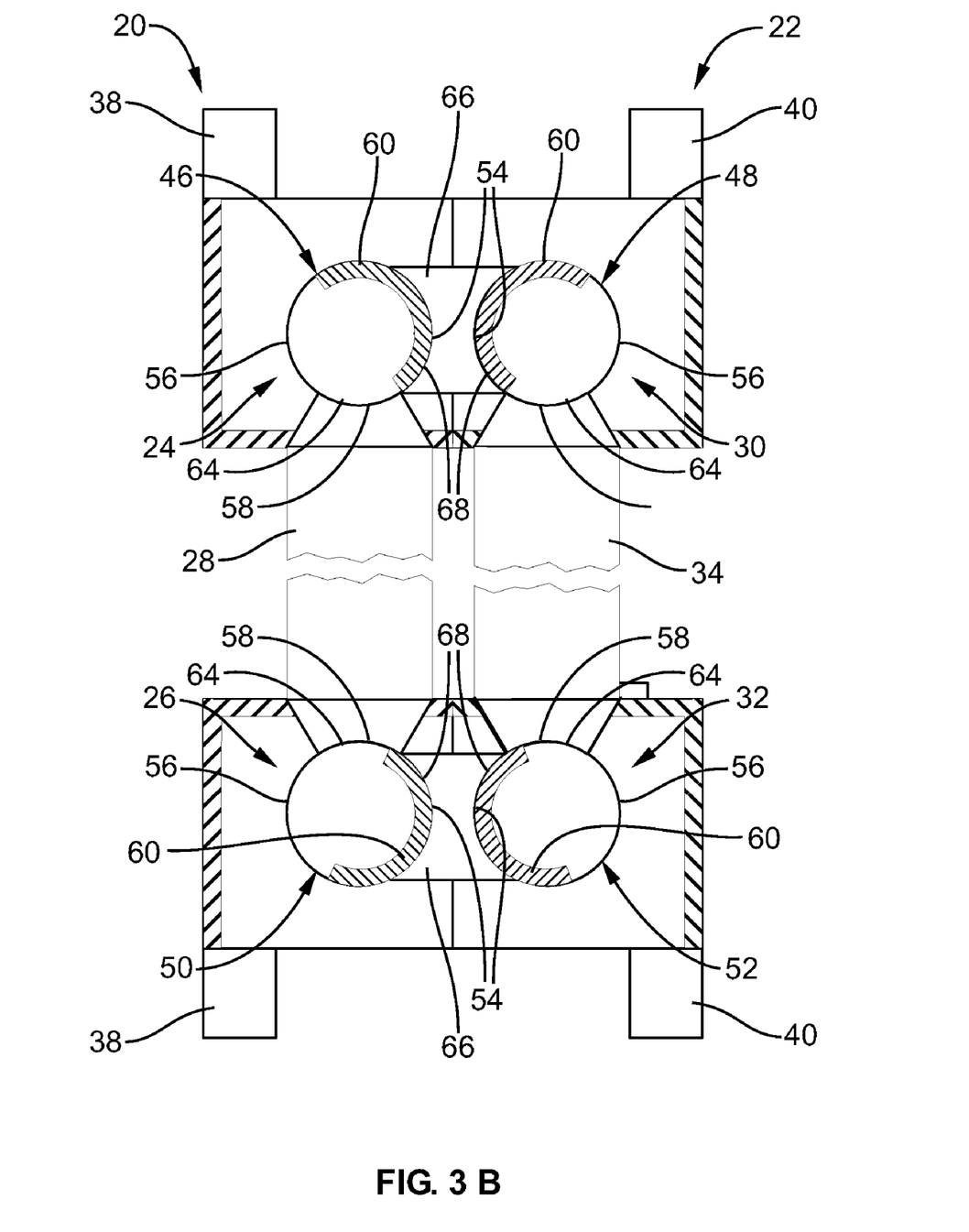
FIG. 3A is a cross sectional view of the present invention in the maximum cooling mode.
FIG. 3B is a cross sectional view of the present invention in the temperate mode.
FIG. 3C is a cross sectional view of the present invention in the maximum heating mode.
Figure 3A:
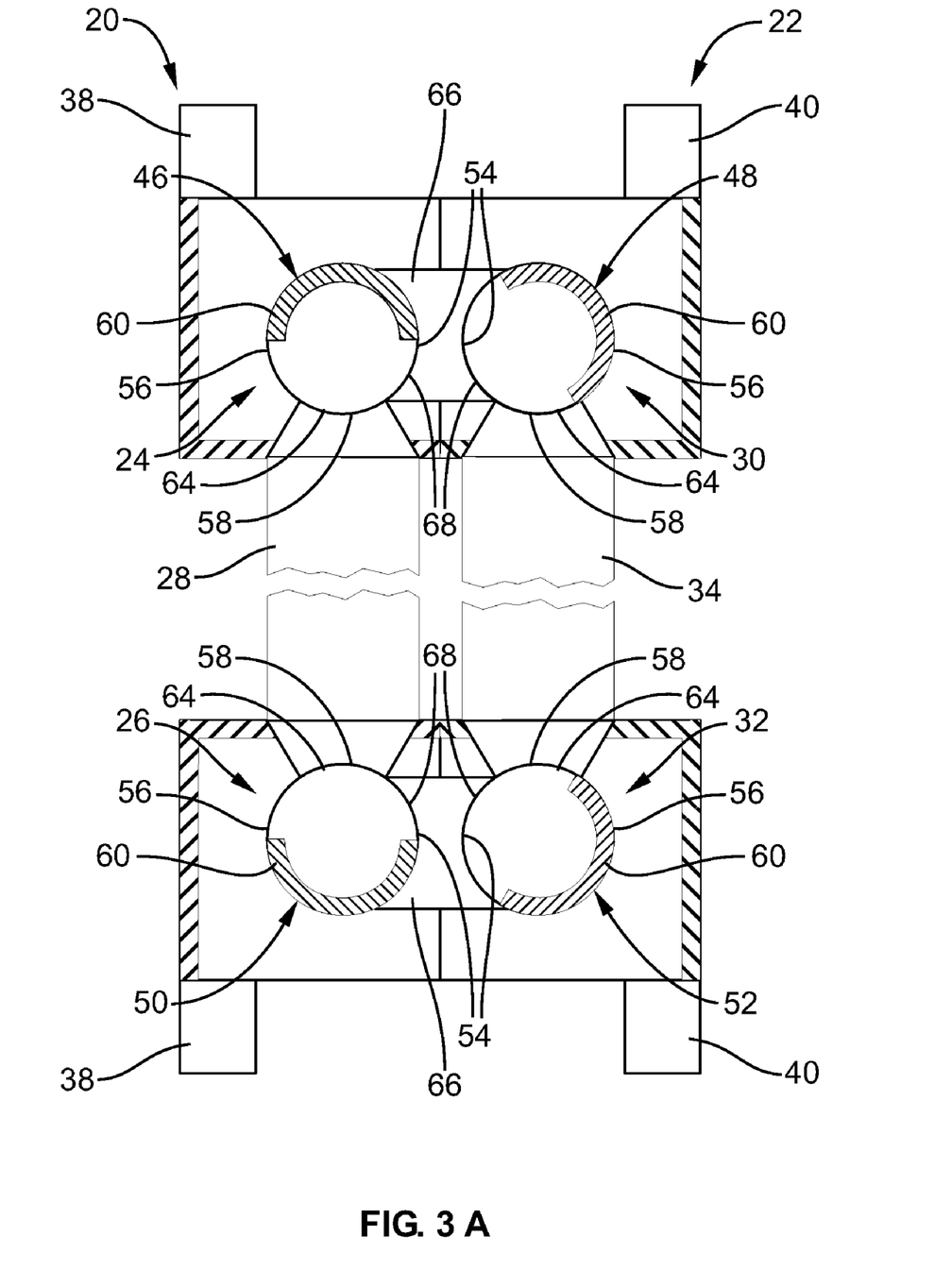
Figure 5:
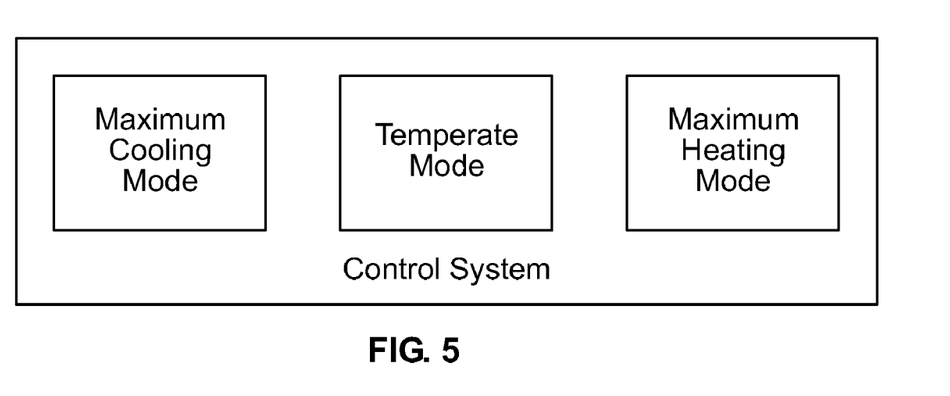
FIG. 5 is a block diagram of the control system of the present invention.

The valve system includes a control system, generally shown in FIG. 5, for rotating each of the valve elements 60 of the first rotary valves 46, 50 to the intermediate position and each of the valve elements 60 of the second rotary valves 48, 52 to the cross flow position to establish the fluid flow from the first upper manifold 24 through both of the first and second tubes 28, 34 to the first lower manifold 26 while in the maximum cooling mode, as shown in FIG. 3A. The control system rotates all of the valve elements 60 to the blocking position to establish the fluid flow from the first upper manifold 24 through the first tubes 28 to the first lower manifold 26 and from the second upper manifold 30 through the second tubes 34 to the second lower manifold 32 while in the temperate mode, as shown in FIG. 3B. The control system further rotates each of the valve elements 60 of the first rotary valves 46, 50 to the cross flow position and each of the valve elements 60 of the second rotary 48, 52 to the intermediate position to establish the fluid flow from the second upper manifold 30 through both of the first and second tubes 28, 34 to the lower manifold while in the maximum heating mode, as shown in FIG. 3C.

More specifically, when the system is operating in the maximum cooling mode, illustrated in FIG. 3A, the valve elements 60 in the first manifolds 24, 26 of the first heat exchanger 20 are rotated to the intermediate position so that the valve element 60 is open to the manifold ports 56, cross flow ports 54 and tube ports 58. In this mode, fluid flows from the first manifolds 24, 26 into the first rotary valves 46, 50 through the manifold ports 56. The fluid then flows through the cross flow ports 54 and through the cross flow housings 66 to the second rotary valves 48, 52 of the second manifolds 32, 30. The valve elements 60 in the second manifolds 32, 30 are rotated to the cross flow position so that the valve element 60 is open to the cross flow ports 54 and tube ports 58, but closed to the manifold ports 56, blocking the fluid in the second manifolds 32, 30 from entering the second rotary valves 48, 52. The fluid flows through both of the tubes 28, 34, thus operating to cool the cabin of a vehicle.

When the system is operating in the tempering mode, illustrated in FIG. 3B, all of the valve elements 60 in all of the of manifolds 24, 26, 30, 32 are in the blocking position, preventing any fluid from the first manifolds 24, 26 to enter the second manifolds 32, 30 and vice versa. In other words, coolant flows through the first tubes 28, while hot engine fluid flows through the second tubes 34.

Figure 3C:
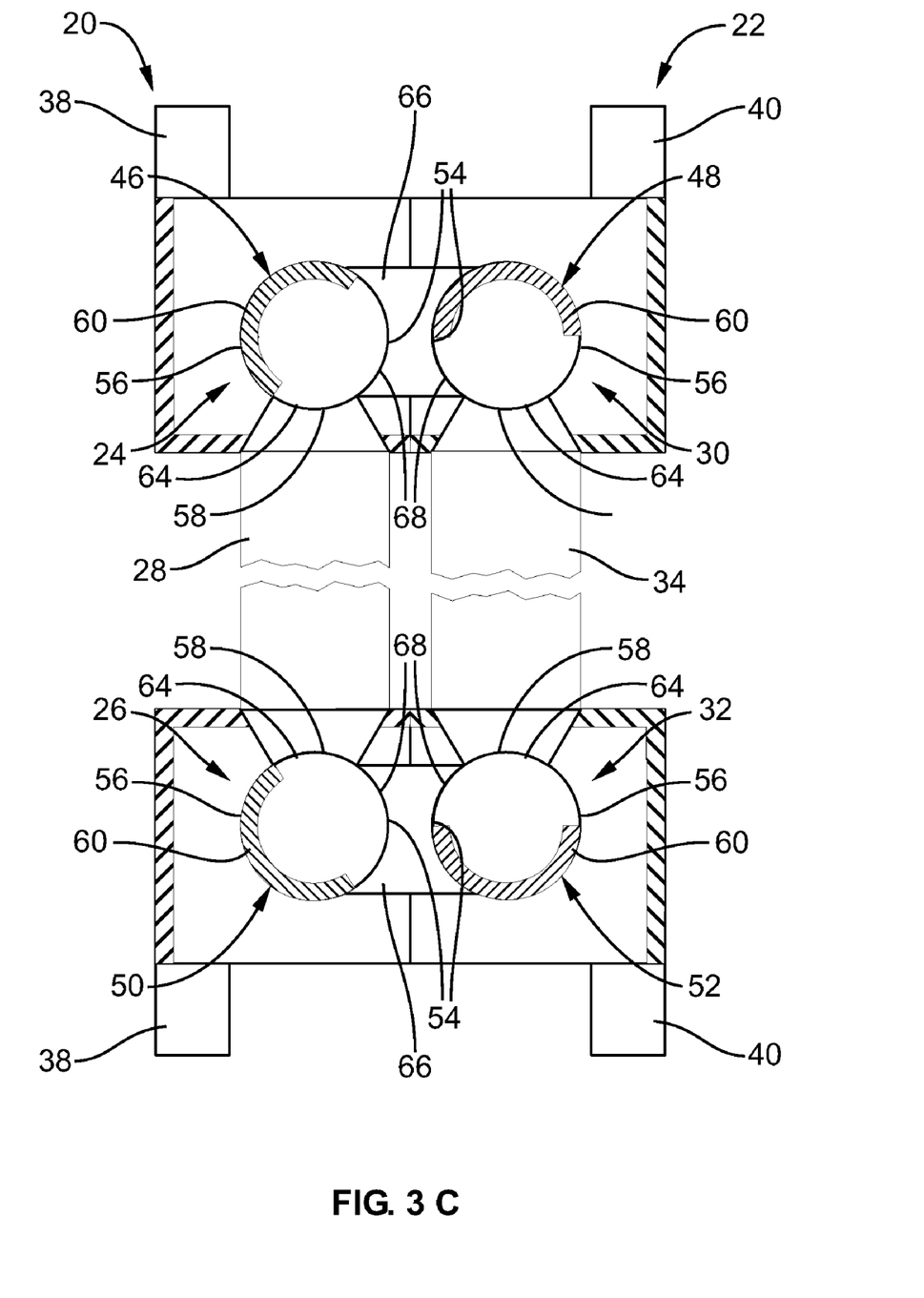

When the system is operating in the maximum heating mode, illustrated in FIG. 3C, the valve elements 60 in the second manifolds 32, 30 of the second heat exchangers 22 are rotated to the intermediate position so that the valve element 60 is open to the manifold ports 56, cross flow ports 54 and tube ports 58. Fluid flows from the second manifolds 32, 30 into the second rotary valves 48, 52 through the manifold ports 56. In this mode, fluid then flows through the cross flow ports 54 and through the cross flow housings 66 to the first rotary valves 46, 50 of the first manifolds 24, 26. The valve elements 60 in the first manifolds 24, 26 are rotated to the cross flow position so that the valve element 60 is open to the cross flow ports 54 and tube ports 58, but closed to the manifold ports 56, blocking the fluid in the first manifolds 24, 26 from entering the second rotary valves 48, 52. The fluid flows through both of the tubes 28, 34, thus operating to heat the cabin of a vehicle.

The control system includes a mechanical system 72 which can be a motor 72 connected to each of the semi-circular valve elements 60 for rotating each of the valve elements 60 between the positions, i.e., the maximum cooling position, temperate position and maximum heating position. The mechanical system 72 may be any system used to rotate the valve elements 60. A valve cap 74 disposed on one end of each valve element 60 for connection to a shaft 76 extending from the motor 72.

Figure 6:
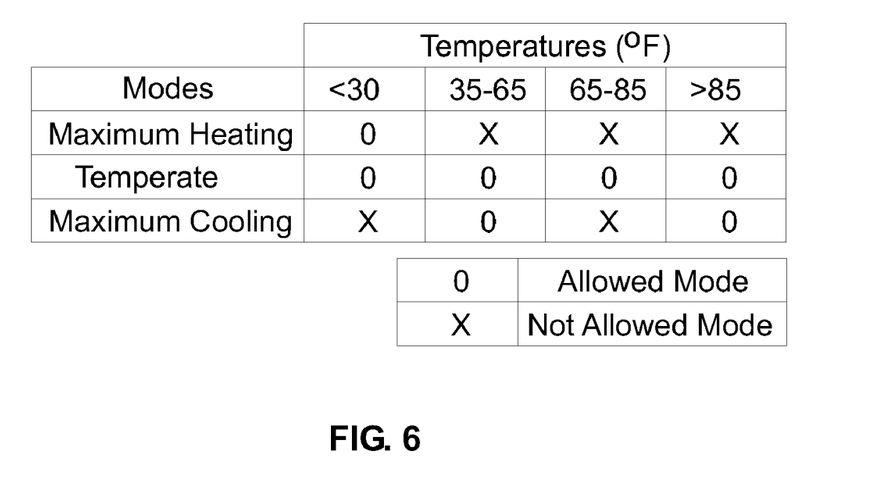
FIG. 6 is a table of the mode constraints in the control system.

The control system further defines a plurality of constraints to prevent flash fogging while the system moves from the maximum cooling mode to the maximum heating mode. As indicated in FIG. 6, the system may always operate in the temperate mode. The maximum heating mode may only be implemented when the ambient temperature is less than 30 degrees Fahrenheit. The maximum cooling mode may be implemented when the ambient temperature is between 35 and 65 degrees Fahrenheit and when the temperature is more than 85 degrees Fahrenheit.

It is to be understood that "upper" and "lower" as used in the present application are merely descriptive and not structurally limiting, inasmuch as a heat exchanger can be oriented in different directions. Therefore, "upper" and "lower" should be understood to be used with reference to the orientation of the manifolds 24, 26, 30, 32 and tubes 28, 34 as shown in the drawings herein, and is not limiting the orientation of the manifolds 24, 26, 30, 32 or tubes 28, 34 in actual use. Further "first" and "second" as used in the present application are merely descriptive, inasmuch as differentiating the heat exchangers 20, 22. In other words, the invention as described herein refers to the first heat exchanger 20 as accepting cool fluid and the second heat exchanger 22 accepting hot fluid, but is not limited to this configuration, as the fluid and heat exchangers 20, 22 may be reversed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An integral heating and cooling assembly comprising:
 a first heat exchanger and a second heat exchanger sandwiched together in a parallel and abutting relationship to one another;
 said first heat exchanger including a first upper manifold and a first lower manifold spaced and parallel from said first upper manifold;
 said first heat exchanger including a plurality of first tubes parallel and spaced relative to one another and extending between said first manifolds;
 said second heat exchanger including a second upper manifold and a second lower manifold spaced and parallel from said second upper manifold;
 said second heat exchanger including a plurality of second tubes parallel and spaced relative to one another and extending between said second manifolds;
 an upper cross flow housing hydraulically connecting said first upper manifold with second upper manifold;
 a lower cross flow housing hydraulically connecting said first lower manifold with said second manifold; and
 a valve system having a first upper rotary valve disposed in said first upper manifold, a second upper rotary valve disposed in said second upper manifold, a first lower rotary valve disposed in said first lower manifold, and a second lower rotary valve disposed in said second lower manifold,
 wherein said valve system is configurable to provide (1) a maximum cooling mode in which fluid flows from said first upper manifold through both of said tubes to said first lower manifold, (2) a temperate mode in which fluid flows from said first upper manifold through said first tubes to said first lower manifold and from said second upper manifold through said second tubes to said second lower manifold, and (3) a maximum heating mode in which fluid flows from said second upper manifold through both of said first and second tubes to said second lower manifold;
 wherein each of said upper rotary valves defines a cross flow port for fluid flow between said upper manifolds through said upper cross flow housing;
 wherein each of said lower rotary valves defines a cross flow port for fluid flow between said lower manifolds through said lower cross flow housing;
 wherein each of said rotary valves defines a manifold port for fluid communication with said manifold in which said rotary valve is disposed and a tube port for fluid communication with said tubes associated with said manifold in which said rotary valve is disposed; and
 wherein each of said rotary valves includes a semi-circular valve element rotatable between three positions;
 (1) a cross flow position in which associated said manifold port is blocked and associated cross flow port is opened;
 (2) a blocking position in which associated manifold flow port is opened and associated cross flow port is blocked; and
 (3) an intermediate position in which associated said manifold port and associated said cross flow port are partially opened.

2. The assembly as set forth in claim 1 wherein said valve system includes a control system for (1) rotating each of said valve elements of said first rotary valves to said intermediate position and each of said valve elements of said second rotary valves rotating to said cross flow position to establish the fluid flow from said first upper manifold through both of said first and second tubes to said first lower manifold while in said maximum cooling mode, (2) for rotating all of said valve elements to said blocking position to establish the fluid flow from said first upper manifold through said first tubes to said first lower manifold and from said second upper manifold through said second tubes to said second lower manifold while in said temperate mode, and (3) for rotating each of said valve elements of said first rotary valves to said cross flow position and said valve elements of said second rotary valves to said intermediate position to establish the fluid flow from said second upper manifold through both of said first and second tubes to said lower second manifold while in said maximum heating mode.

3. The assembly as set forth in claim 2 wherein said control system includes a mechanical system connected to each of said semi-circular valve elements for rotating said valve elements between said cross flow position and said intermediate position and said blocking position.

4. The assembly as set forth in claim 3 wherein said mechanical system is a motor for rotating said valve elements between said cross flow position and said intermediate position and said blocking position.

5. The assembly as set forth in claim 1 wherein each of said tube ports are defined by a tube cap extending into the associated one of said manifolds from each of said tubes and defining a semi-circular tube mouth.

6. The assembly as set forth in claim 5 wherein each of said cross flow ports between said upper manifolds and between said lower manifolds are defined by said cross flow housing disposed above and laterally overlapping said tubes to establish cross flow mouths.

7. The assembly as set forth in claim 6 wherein said valve system includes a ring disposed on each side of said tube caps and engaging the respective sides of said cross flow housings and rotatably supporting said semi-circular valve element.

8. The assembly as set forth in claim 7 wherein said tubes present flat sides and including a plurality of air fins disposed between and brazed to said flat sides of said tubes and extending between said upper and lower manifolds for dissipating heat from said tubes.

* * * * *